Jan. 30, 1968
D. E. DRAKE
3,366,533
METHOD OF FORMING A UNITARY DIELECTRIC
PAPER AND PAPER THEREOF
Filed March 18, 1965
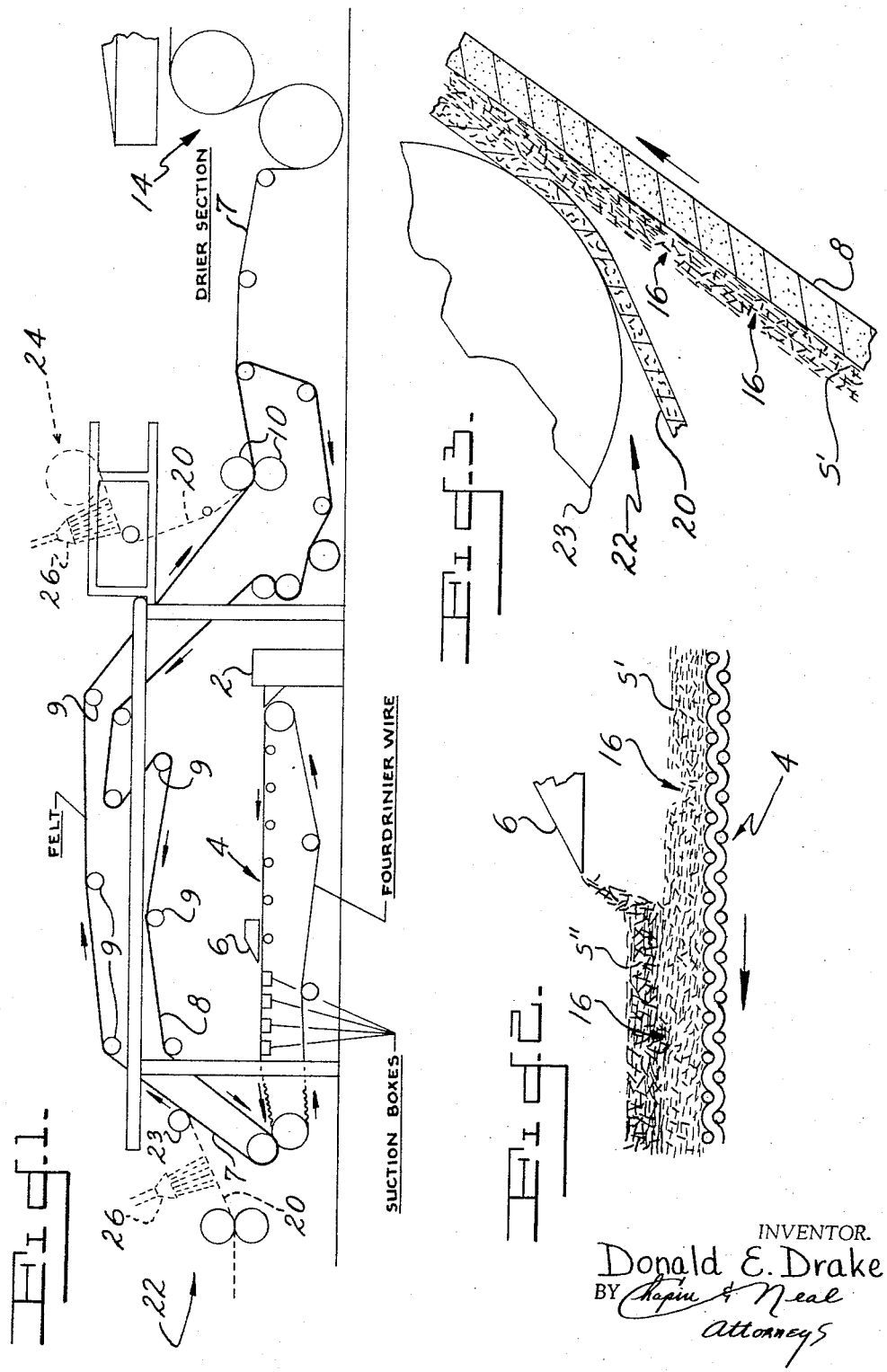
INVENTOR.
Donald E. Drake
BY Chapin & Neal
Attorneys

United States Patent Office 3,366,533
Patented Jan. 30, 1968

3,366,533
METHOD OF FORMING A UNITARY DIELECTRIC PAPER AND PAPER THEREOF
Donald E. Drake, Westfield, Mass., assignor to Stevens Paper Mills, Inc., Westfield, Mass., a corporation of Delaware
Filed Mar. 18, 1965, Ser. No. 440,785
4 Claims. (Cl. 162—138)

ABSTRACT OF THE DISCLOSURE

Electrical paper made by forming a first web from a slurry containing relatively fine cellulosic fibers, applying to the web a second slurry containing relatively coarse fibers and forming together the first web and fibers of the second slurry to produce a unitary sheet characterized by relatively fine fibers in the fractional portion toward one side of the sheet and relatively coarse fibers in the portion toward the other side of the sheet.

---

Electrical capacitors, especially large capacitors may be fabricated using webs of metal foil, such as aluminum, which are wound as a pair of electrodes spaced apart by a number of layers of electrical paper. The foil and paper are wound convolutely turn-upon-turn as is well known in the art. Capacitors of this type are impregnated with a suitable dielectric liquid, such as a chlorinated diphenyl or the like. In the manufacture of wound capacitors, the paper disposed between the foil layers consists of a plurality of sheets of high-grade, very thin paper, on the order of .5 mil, made entirely from wood pulp prepared by the sulphate process.

As shown, for example, in U.S. Patents Nos. 2,505,545 and 2,934,686, two or more sheets of impregnated electrical paper are invariably used in making wound capacitors because commercially acceptable breakdown voltages have not heretofore been attainable using a single sheet of dielectric paper. For example, using a single sheet the electrical breakdown is found to be on the order of 200–300 volts per mil thickness of paper. In fact, numerous attempts to make commercially useful capacitors using a single sheet of electrical paper have usually resulted in 30% failure up to 200 volts.

While it might ordinarily be expected that electrical breakdown can be improved proportionally to the thickness of the paper, this has not been the case. Apparently, the reason for this phenomenon is that electrical breakdown occurs at weak spots in the paper which are not eliminated by increasing the thickness of the paper. Therefore, it is conventional practice to superimpose two or more sheets of paper between conductors, whereby, under the law of probability, the chance alignment of two weak spots is minimized.

Although the use of multiple discrete sheets of dielectric paper greatly improves the electrical breakdown characteristics of capacitors, there are inherent manufacturing drawbacks in the fabrication of multi-sheet capacitors which would be eliminated by using a single sheet between foils. Advantages in one single sheet construction include:

(1) Reduced paper cost
(2) Simplified capacitor fabrication with resulting improvement in winding efficiency and speed
(3) Reduced paper breakage during winding process.

Notwithstanding these advantages, however, insofar as is known, there are no commercially available capacitors which employ a single layer of paper between the layers of foil.

The principal object of this invention is to provide electrical paper having properties which permit the use of a single sheet thereof in the manufacture of commercially useful wound capacitors and transformers, or in any case, a decrease in the number of sheets used in capacitors and transformers.

Another object of this invention is to provide improved capacitor construction using a single sheet of electrical paper interposed between the turns of the metal foil.

A further object of this invention is to provide a method of making electrical paper resulting in a single sheet having equal or superior dielectric strength to two or more conventional sheets having the same total thickness.

This invention may be generally characterized by the formation of a unitary sheet of electrical paper using one pulp stock to form, at least partially, a sheet of paper, and thereafter overlaying on the sheet while in its formative state, a second sheet or slurry composed of a second fibrous stock and completing the formation of a unitary sheet therefrom. In one embodiment of the invention the first pulp stock is comprised of relatively fine fibrous material and the second stock is a relatively coarse fibrous stock applied as a slurry to the first stock, while it is in a sheet forming stage.

The above and other objects of this invention will be more readily apparent from the following description and with reference to the accompanying drawing, in which FIG. 1 is a diagrammatical view illustrative of paper making equipment of the type which may be used in carrying out this invention;

FIG. 2 is a greatly enlarged cross sectional view illustrative of one method of making paper in accordance with this invention; and FIG. 3 is illustrative of an alternative method of making paper in accordance with this invention.

While the concept of multi-ply sheets has been used in making filter paper, surface textured cardboard and the like as typified by Patents Nos. 2,098,733, 2,881,669 and 2,928,765, insofar as is known, there has never been an electrical paper of sufficient quality to make single sheet capacitors.

To assist in a more complete understanding of this invention, it is important to understand the concepts of fiber bonding. As is well known, a dry sheet of paper has much greater tensile strength than wet paper, the strength being the result of fiber bonding during drying of cellulose fibers which make up wood pulp slurry. As generally recognized, there are a number of stages in fiber bonding. Surface tension is usually considered important in the first stage of consolidation of the fibers into a web. Surface tension is an important factor until the water content of the slurry decreases to about 80%, by weight, at which the second stage of bonding takes place. At approximately this water content, air intrusion into the web becomes a substantial factor, and during this phase, while the water between the fibers is generally displaced by air, a film of water remains on the surface of the fibers. Web strength of the paper at this stage is due primarily to interfiber friction.

The third bonding stage occurs when no free water remains in the web and the soft, limp, swollen fibers become intimately associated. At this stage, the wet tensile strength of the web increases rapidly and is believed to be related to the degree of processing or beating to which the fibers have been previously subjected.

It is postulated by experts in the paper field, that after the free water is removed from a web of paper, the predominant force in fiber bonding is molecular adhesion between hydroxyl groups of contiguous fibers. In this connection, as is well known, cellulose fibers are composed of anhydrous glucose units, each having three hydroxyl groups. The basis for the theory that hydrogen bonding provides a predominant bonding force between cellulose fibers is supported by the fact that the energy necessary to rupture the bonds is comparable to that liberated from hydrogen bonds formed during drying of the paper. In addition, it has been found that paper can be produced with a density closely approaching the absolute density for cellulose fibers of 1.55 grams per cc. This indicates that separation of the fibers approaches molecular dimensions at which molecular adhesion is effective. Furthermore, tensile strengths of paper, gelatinized with zinc chloride, may run in the neighborhood of 18,000–20,000 pounds per square inch, which compares favorably with tensile strength of cast iron, copper or aluminum.

In accordance with this invention, paper is made from wood pulp having the following properties:

(a) Alpha cellulose content _____ 85–96%
(b) Pentosans content _____ 2.5–10.0%
(c) Ash _____ .35% max.
(d) Permangante No. _____ 10.5–19.0
(e) Viscosity _____ 200–420

Pulp of the type described, may be refined in any suitable equipment, such as disc refiners, Jordans, beaters or the like. Two separate slurries are produced, each refined or beaten to substantially different degrees of refinement so as to provide relatively fine and coarse fiber stocks.

The following is illustrative of the procedure used to make a 1.3 mil electrical paper, embodying this invention. The example is given merely by way of illustration of the invention and is not to be considered as limiting its scope.

A beater was charged with one load of 2750 pounds wood pulp; water was added to obtain a pulp having a consistency of about 5.5%. The beater was operated for 3 hours at a standard roll speed and with a setting of 85–100% roll pressure. After beating, the slurry was tested and was found to have a Schopper-Reigler final freeness of 10–20 cc., a weighted fiber length of .500 mm. and a pulp slowness of 33 seconds.

A second slurry was made by charging a beater with 2,000 pounds of identical wood pulp, water being added to provide a pulp having a consistency of 6.0%. The pulp was beaten for 5 hours at the same roll speed as the first batch, with a beater pressure setting of 45–65% roll pressure. This pulp was tested in the same manner as the first batch and had a final freeness (Schopper-Riegler) of 30–50 cc., a weighted fiber length of .650 mm. and pulp slowness of 38 seconds.

The tests conducted on these two pulps, showed that the first pulp was characterized by an average fiber length, indicative of a degree of refinement, approximately 30% more than the second pulp. The first pulp, having a weighted fiber length of .500 was then diluted in a head box 2 to form a slurry with a consistency of approximately .3%. This slurry, having a water content of approximately 99.78%, by weight, was applied from the head box 2 to a Fourdrinier wire 4 in the conventional manner. At a point along the Fourdrinier wire at which the first slurry s' (FIG. 2) can be said to become a wet sheet, in the formative stage, the second relatively coarse slurry s'', at a consistency of about .5% was laid thereon from a secondary head box 6. It should be realized that at the time of application of the second slurry s'', the first slurry s' still has a water content of well over 90%, by weight.

Thereafter, the two slurries were processed together in a conventional manner, and as shown in FIG. 1, the composite sheet 7 was carried on a felt web 8 such as employed in the "Harper" type Fourdrinier paper machine. As shown, the path of the felt is around a series of rolls 9 disposed above the Fourdrinier wire. The felt then passes downwardly between press rolls 10, at which point the sheet 7 is removed from the felt and lead through the drier section of the machine, shown generally at 14 in FIG. 1.

Microscopic inspection of the finished sheet produced by the process described showed it to be unitary in character, and as regards its unitary character it is as though there had been no time delay or time sequence in the application of the fine and coarse slurries to the Fourdrinier wire.

In addition to the paper described above, a number of other sheets of paper were made using essentially the same process but with variations in the weighted fiber lengths of the pulps combined. Sheets having thicknesses of 1.37 mils, 1.44 mils and 1.6 mils were wound with foils to form wound capacitors. These were immersed in dielectric fluid and tested, using standard breakdown voltage tests. Identical comparison tests were also made embodying conventional electrical paper having approximately the same thickness and density as the sheets embodying the invention. A single sheet of conventional electrical paper was used in one test, and in another, two sheets were used having the same overall thickness as the single sheet. The results of these tests are listed below:

|  | Sheets Embodying Invention | | | Conventional Paper | |
| --- | --- | --- | --- | --- | --- |
| Thickness, mils | 1.37 | 1.44 | 1.6 | 1.49 | .7 |
| Density, g./cc. | .78 | .775 | .77 | .79 | .72 |
| Sheets between foils | One | One | One | One | Two |
| Breakdown Voltage | 3,800 | 4,250 | 4,000 | 2,150 | 2,900 |
|  | 3,400 | 4,550 | 4,500 | 3,300 | 2,500 |
|  | 3,600 | 4,400 | 4,300 | 2,550 | 2,850 |
|  | 3,200 | 4,450 | 4,500 | 2,900 | 2,800 |
|  | 3,400 | 4,300 | 5,000 | 2,850 | 2,800 |
|  | 3,200 | 4,050 | 4,600 | 3,000 | 2,850 |
|  | 3,500 | 3,000 | 4,600 | 3,050 | 2,750 |
|  | 3,200 | 4,400 | 4,100 | 3,300 | 2,800 |
|  | 3,500 | 4,100 | 4,800 | 3,000 | 2,900 |
|  | 3,600 | 4,250 | 5,000 | 1,000 | 2,750 |
|  | 3,500 | 4,150 | 4,200 | 1,200 | 2,850 |
|  | 3,700 | 3,800 | 4,300 | 2,900 | 2,850 |
|  | 3,800 | 4,400 | 5,200 | 2,300 | 2,700 |
|  | 3,400 | 4,450 | 4,600 | 2,750 | 2,950 |
|  | 3,500 | 4,450 | 4,400 | 2,150 | 2,850 |
|  | 3,500 | 4,100 | 4,600 | 3,100 | 2,750 |
|  | 3,500 | 3,950 | 4,900 | 2,950 | 2,350 |
|  | 3,300 | 4,150 | 4,200 | 2,600 | 2,400 |
|  | 3,200 | 3,450 | 4,600 | [1] 200 | 2,900 |
|  | 3,600 | 3,950 | 4,600 | [1] 200 | 2,850 |
| Avg. volts, DC | 3,450 | 4,120 | 4,550 | 2,620 | 2,765 |
| Avg. volts/mil | 2,515 | 2,860 | 2,840 | 1,725 | 2,015 |

[1] These units showed dead short at 200 volts, the initial voltage applied. The actual breakdown voltage of the units may have been considerably lower than the initial voltage applied.

The capacitors used in the above tests were all made in the same way, each having a total of approximately 8.8 square feet of foil area and the paper impregnated with "Aroclor" which is a chlorinated diphenyl.

The breakdown voltage listed in the above table clearly shows that a single sheet of paper, made in accordance with this invention, has approximately a 50–60% higher breakdown voltage than conventional paper of the same thickness. While, in addition, there was an unexpected improvement of dielectric strength over the use of two conventional sheets of equivalent total thickness, the important aspect of this invention is to provide in single sheet form, an electrical paper having dielectric strengths sufficiently comparable to two sheets of electrical paper whereby the number of sheets used in making wound capacitors or transformers may be decreased.

Tensile strength tests were also made to compare paper made in accordance with this invention and conventional electrical paper of the same thickness. The strengths obtained in the machine direction were approximately equal, while in the cross machine direction the conventional papers tested at 6.0–6.6 pounds per inch and the new paper at 9.4–9.6 pounds per inch.

As previously discussed, it is postulated that high voltage breakdown of electrical paper is caused by "weak spots," voids or minimum density areas extending substantially through the paper and resulting from non-uniform distribution of the pulp fibers as illustrated at 16 in FIG. 2. Because of the nature of the paper-making process, these weak spots, as a practical matter, are almost impossible to eliminate completely.

In accordance with this invention, however, by applying a second less refined fibrous material, such as a slurry s″ onto the first slurry, there is a tendency for the generally larger fibers to bridge voids 16 in the primary web and for the fibrous debris in the coarse slurry to fill the voids. Moreover, the bridge of the relatively coarse fibers tends to prevent translation of voids to the upper surface of the coarse secondary web. Test results seem to substantiate this proposition whereby a unitary sheet is produced having no voids which extend through the entire thickness of the sheet.

Attempts have also been made to reverse the procedure described by first applying a relatively coarse slurry to the Fourdrinier and then overlaying a relatively fine slurry. Slurries of approximately the same degree of refinement were also tested, but it was found that these procedures were not satisfactory since the paper tested in general was no better than conventional electrical paper and was thus inferior to the unusual results obtained by the process described.

It has been found that the use of relatively coarse pulps having weighted fiber lengths in the range of .57–.75 mm. overlaid on relatively fine pulps having a weighted fiber length in the range of .42–.52 mm. produce superior electrical paper.

An alternate method of practicing this invention is illustrated in FIG. 3. Having found that superior electrical paper resulted from overlaying a coarse slurry on a fine slurry, the possibility was considered of forming a unitary sheet of electrical paper by forming a primary web of paper from a pulp slurry, as described above and illustrated in FIGS. 1 and 2. After this primary web, still in its formative stage, is picked up by the felt 8, a secondary web of relatively coarse cellulosic fibrous material 20, in its formative stage, may be overlaid and pressed against the surface of the primary web by any suitable means, such as roll 23. The web 20 may be formed on a second sheet-forming-wire or Fourdrinier simultaneously with the formation of the primary web s′. Alternatively, it has been found that the web 20 may be a finished sheet of electrical paper, preferably in a wet condition.

In this embodiment, a portion of the thickness of the sheet is in effect formed in situ on the existing sheet 20. It has been found that the sheet 20 can be applied at any location from the initial pickup of the pirmary web s′ on the felt 8 to just prior to the press rolls 10. Thus, as shown in FIG. 1, the sheet 20 can be superimposed from a position such as indicated at 22 to a position such as indicated at 24. Suitable means, such as sprays 26, may be provided to wet the sheet with water. While the alternative method shown in FIG. 3 lacks some of the cost advantages of the preferred method shown in FIG. 2, a unitary sheet is nevertheless obtained which has electrical properties comparable to those obtained using the two pulp process. It has been found that a unitary sheet can be obtained so long as the water content of the primary web is not reduced substantially below 90% at the time the second sheet is applied.

Of course, as shown in FIG. 3, by applying a paper sheet 20 to the primary web, the voids 16 in the web s′ are bridged whereby the probability of weak spots extending through the composite sheet is minimized.

The processes embodying this invention essentially eliminate fiber bridging in which a fiber extends from surface-to-surface of the sheet and thus provides along the bridging fiber a possible voltage path through the sheet.

In the two slurry method, in which a coarse fiber stock is laid on a fine stock, when the composite web is picked up on the felt of the paper machine, the coarse stock is disposed toward the felt and water is drained through the coarse fibers without disrupting the layment of fine fibers. As a result, paper embodying this invention is characterized, in cross section, as having relatively fine fibers in the fractional portion toward the wire side of the sheet and relatively coarse fibers in the fractional portion toward the felt side of the sheet. This is true of the two web or sheet embodiment as well as the two slurry method, where the coarse-fibered web or sheet is superimposed on the fine-fibered web.

Both embodiments of this invention provide a single sheet of electrical paper which is comparable or superior in dielectric strength to two sheets of conventional paper. In addition, the manufacture of capacitors or transformers is greatly facilitated since single sheet winding is inherently easier and more efficient than multiple sheet winding. Moreover, the single sheet has less tendency to break during winding than multiple sheets of half thickness. Furthermore, there are advantages in handling, storage and machine operating time in relation to effective footage of dielectric paper production.

Of the processes embodying this invention, the two pulp process is preferable because of reduced production time. In this connection, for example, 500 feet of 5 mil paper embodying the invention can be produced in approximately half the machine time of 1000 feet of 2.5 mil conventional paper, two sheet of which are electrically equivalent of the 5 mil paper.

While all of the reasons for the improved results obtained by this invention are not fully understood, it is apparent from the test data obtained that by practice of the process disclosed herein an electrical paper can be produced which is remarkably superior to conventional paper heretofore available.

Having thus disclosed this invention, what is claimed is:

1. Method of making electrical paper having a thickness in the range 0.5–5.0 mils comprising the steps of applying to a sheet-forming wire a first cellulosic fiber-water slurry to form a primary web, in which the fibers have a weighted fiber length of .42–.52 mm., thereafter applying to the primary web a second cellulosic fiber-water slurry in which the fibers have a weighted fiber length of .57–.75 mm., said second slurry being applied while the primary web still contains water in an amount not substantially less than 90%, by weight, and forming a unitary sheet composed of the two fibrous materials.

2. Method of making electrical paper comprising the steps of laying on a Fourdrinier wire a wood pulp composed of relatively fine fibers having a weighted fiber length of .42–.52 mm., to form a primary web, after a predetermined time, and while said primary web has a water content of not substantially less than 90% by weight, applying to the primary web a second wood pulp composed of relatively coarse fibers having a weighted fiber length of .57–.75 mm., and transferring the primary web and second pulp to a felt web and by water drainage and drying forming a unitary sheet of electrical paper in which the fibers are joined by hydrogen bonding.

3. Electrical paper comprising a unitary sheet of a thickness from 0.5 to 5 mils, said sheet having a wire side and a felt side and being characterized in cross section by the fractional portion toward said wire side of relatively fine cellulosic fibers, having a weighted fiber length of .42–.52 mm., and in the fractional portion toward said felt side, by relatively coarse cellulosic fibers, having a weighted fiber length of .57–.75 mm.

4. Method of making electrical paper comprising the steps of forming a primary web from a slurry containing cellulosic fibers having weighted fiber length of .42–.52 mm. applying to the primary web while said web has a water content of not substantially less than 90% by weight a second fibrous slurry containing cellulosic fibers having a weighted fiber length of .57–.75 mm. and forming together the primary web and the fibers of said second fibrous slurry to produce a unitary sheet of paper.

References Cited

UNITED STATES PATENTS

| | | | |
|---|---|---|---|
| 1,682,826 | 9/1928 | Bidwell | 162—133 |
| 1,757,010 | 5/1930 | Fair | 162—138 X |
| 2,098,733 | 11/1937 | Sale | 162—130 |
| 2,414,833 | 1/1947 | Osborne | 162—188 X |
| 2,870,689 | 1/1959 | Brennan | 162—188 X |
| 2,881,072 | 4/1959 | Clark | 162—201 X |
| 2,881,669 | 4/1959 | Thomas et al. | 162—130 |
| 2,913,365 | 11/1959 | Osborne et al. | 162—201 |

S. LEON BASHORE, *Primary Examiner.*